(12) United States Patent
Cho et al.

(10) Patent No.: US 9,170,678 B2
(45) Date of Patent: Oct. 27, 2015

(54) FOLDABLE DISPLAY DEVICE PROVIDING ADAPTIVE TOUCH SENSITIVE AREA AND METHOD FOR CONTROLLING THE SAME

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/505,226

(22) Filed: Oct. 2, 2014

(65) Prior Publication Data

US 2015/0015525 A1 Jan. 15, 2015

Related U.S. Application Data

(63) Continuation of application No. 14/165,242, filed on Jan. 27, 2014, now Pat. No. 8,854,332, which is a continuation of application No. 13/918,224, filed on Jun. 14, 2013, now Pat. No. 8,654,095.

(60) Provisional application No. 61/803,758, filed on Mar. 20, 2013.

(30) Foreign Application Priority Data

May 20, 2013 (KR) ........................ 10-2013-0056757

(51) Int. Cl.
*G06F 3/041* (2006.01)
*G06F 3/0488* (2013.01)
*G06F 1/16* (2006.01)

(52) U.S. Cl.
CPC ............ *G06F 3/0416* (2013.01); *G06F 1/1641* (2013.01); *G06F 1/1643* (2013.01); *G06F 1/1647* (2013.01); *G06F 1/1652* (2013.01); *G06F 3/0412* (2013.01); *G06F 3/0488* (2013.01); *G06F 3/04886* (2013.01); *G06F 2200/1612* (2013.01); *G06F 2203/04102* (2013.01)

(58) Field of Classification Search
None
See application file for complete search history.

(56) References Cited

U.S. PATENT DOCUMENTS

| | | |
|---|---|---|
| 2004/0008191 A1 | 1/2004 | Poupyrev et al. |
| 2008/0291225 A1 | 11/2008 | Arneson |
| 2008/0303782 A1 | 12/2008 | Grant et al. |
| 2009/0174679 A1 | 7/2009 | Westerman |

(Continued)

FOREIGN PATENT DOCUMENTS

EP 2 500 898 A1 9/2012

*Primary Examiner* — Nicholas Lee
(74) *Attorney, Agent, or Firm* — Birch, Stewart, Kolasch & Birch, LLP (57) ABSTRACT

A foldable display device including a foldable display unit being in a folded state when the foldable display device is folded and being in an unfolded state when the foldable display device is unfolded, the foldable display unit being divided into a first area which is a border area, a second area which is a folding area and a third area located between the first area and the second area, touch sensor units of the first area, the second area and the third area configured to detect control input for the display unit, and a controller configured to control the display unit and the touch sensor units, wherein the controller is further configured to detect the state of the foldable display unit, and deactivate the touch sensor unit of the first area and activates the touch sensor units of the second area and the third area, when the foldable display unit is in the unfolded state.

17 Claims, 9 Drawing Sheets

(56) References Cited

U.S. PATENT DOCUMENTS

| | | |
|---|---|---|
| 2010/0117975 A1 | 5/2010 | Cho |
| 2010/0182265 A1 | 7/2010 | Kim et al. |
| 2010/0251112 A1 | 9/2010 | Hinckley et al. |
| 2012/0235894 A1 | 9/2012 | Phillips |
| 2012/0262367 A1 | 10/2012 | Chiu et al. |
| 2012/0262407 A1 | 10/2012 | Hinckley et al. |
| 2013/0033434 A1 | 2/2013 | Richardson et al. |
| 2013/0120239 A1 | 5/2013 | Suzuki et al. |
| 2014/0055375 A1* | 2/2014 | Kim et al. .................. 345/173 |

* cited by examiner

FOLDABLE DISPLAY DEVICE PROVIDING ADAPTIVE TOUCH SENSITIVE AREA AND METHOD FOR CONTROLLING THE SAME

This application is a Continuation of co-pending application Ser. No. 14/165,242 filed Jan. 27, 2014, which is a Continuation of application Ser. No. 13/918,224 filed Jun. 14, 2013, which claims the benefit of U.S. Provisional Application No. 61/803,758, filed on Mar. 20, 2013 and Korean Patent Application No. 10-2013-0056757, filed on May 20, 2013, the entire contents of all of the above applications are hereby incorporated by reference.

BACKGROUND OF THE INVENTION

1. Field of the Invention

The present specification relates to a foldable display device and, more particularly, to a foldable display device including touch sensitive areas which differ according to the state thereof.

2. Discussion of the Related Art

As portable device have come into widespread use, handheld portable devices have become popular. Portable devices have portability due to lightweight and small size. Bendable or foldable portable devices may be produced in order to improve portability. In a portable device including a display unit, the size of a bezel of the display unit may be reduced and a touch sensitive display unit may be provided on a front side thereof in order to provide a wider user interface to a user. If a user holds a portable device by hand, unintended user touch input may occur in a border area of the display unit. In addition, in a foldable display device among portable devices, a border area may be changed according to a folded state. Accordingly, there is a need for a technique of adaptively changing a touch sensitive area of a foldable display device according to a folded state.

SUMMARY OF THE INVENTION

Accordingly, the present specification is directed to a foldable display device providing an adaptive touch sensitive area and a method for controlling the same that substantially obviate one or more problems due to limitations and disadvantages of the related art.

An object of the present specification is to provide a foldable display device for adaptively changing a touch sensitive area and a method for controlling the same. In particular, in the present specification, there is a need for a method of determining which touch sensitive area of a foldable display device is activated according to a folded state.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a foldable display device includes a foldable display unit including a first state which corresponds to a folded state and a second state which corresponds to an unfolded state, the foldable display unit being divided into a first area which is a border area, a second area which is a folding area and a third area located between the first area and the second area, touch sensor units configured to detect control input for the display unit, and a controller configured to control the display unit and the touch sensor units, wherein the controller detects the state of the foldable display unit, deactivates the touch sensor units of the first area and the second area and activates the touch sensor unit of the third area, if the foldable display unit is in the first state, and deactivates the touch sensor unit of the first area and activates the touch sensor units of the second area and the third area, if the foldable display unit is in the second state.

In another aspect of the present specification, a method for controlling a foldable display device includes detecting a state of a foldable display unit, the state of the foldable display unit including a first state which corresponds to a folded state and a second state which corresponds to an unfolded state and the foldable display unit being divided into a first area which is a border area, a second area which is a folding area and a third area located between the first area and the second area, deactivating touch sensor units of the first area and the second area and activating a touch sensor unit of the third area if the foldable display unit is in the first state, and deactivating the touch sensor unit of the first area and activating the touch sensor units of the second area and the third area if the foldable display unit is in the second state.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Hereinafter, the preferred embodiments of the present specification will be described in detail with reference to the accompanying drawings and, however, the range of the present specification is not limited to the embodiments.

Although the terms used in the present specification are selected from generally known and used terms, terms used herein may be variable depending on operator's intention or customs in the art, appearance of a new technology, or the like. In addition, some of the terms mentioned in the description of the present specification have been selected by the applicant at his or her discretion, the detailed meanings of which are described in relevant parts of the description herein. Furthermore, it is required that the present specification is understood, not simply by the actual terms used but by the meanings of each term lying within.

In the present specification, a foldable display device may include a foldable smartphone, a foldable smart pad, a foldable music player, a foldable tablet computer, a foldable laptop, or a flexible display device.

Figure 1:
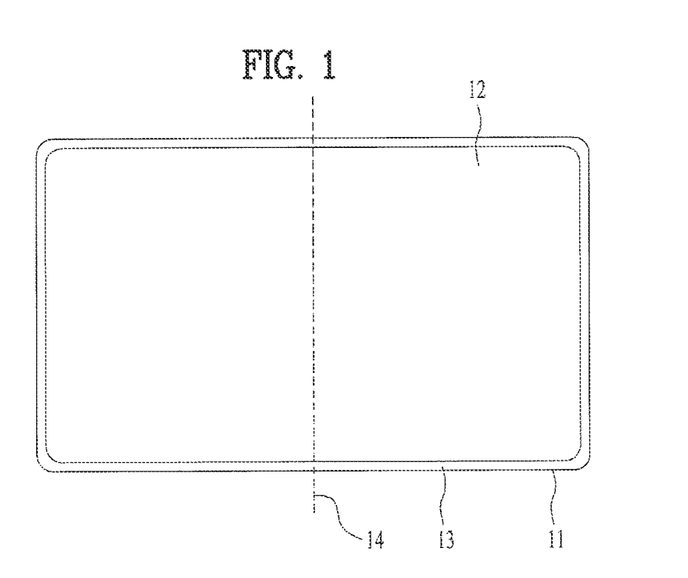
FIG. 1 is a diagram showing a foldable display device according to an embodiment of the present specification.

FIG. 1 is a diagram showing a foldable display device according to an embodiment of the present specification. The foldable display device 11 may include a foldable or bendable display unit 12 and a bezel 13. The foldable display unit 12 may be folded or bent in half with respect to a folding center axis 14 of the foldable display device as described below. The foldable display device 11 of the present specification is not limited to a device folded or bent with respect to a center axis. The foldable display device 11 may be asymmetrically folded. In addition, the foldable display device may include two or more folding areas. For example, the foldable display device 11 having two folding center axes may be folded to a size of ⅓ of the total size thereof by dividing a foldable display unit into three areas. Although a foldable display device divided into two areas is described, the present specification is applicable to a foldable display device divided into three or more areas. The state of the foldable display unit may be equal to that of the foldable display device.

The foldable display unit may not include the bezel 13 and a front area of the foldable display device may be the display unit 12. The foldable display unit may include a touch sensitive display unit.

The foldable display device 11 may be used in a state of being gripped by a user's hand. Accordingly, if the foldable display unit located on the front side of the foldable display device is a touch sensitive display, unintended user touch input may be performed through gripping. That is, when the user grips the foldable display device, the touch sensitive display may be touched. As the bezel of the foldable display device becomes increasingly thin, a probability that unintended user touch input occurs is increased. As a result, the foldable display device 11 may malfunction due to such unintended user touch input. Accordingly, the foldable display device 11 may temporarily deactivate some touch sensitive areas in order to prevent malfunction due to unintentional input through gripping, which will be described in detail with reference to FIGS. 2 to 4.

The state of the foldable display device 11 may be variously changed by folding characteristics. The foldable display device 11 may be set to a folded state or an unfolded state. In addition, the angle range of the foldable display device 11 may be set according to state. For example, if an angle between both sides of the foldable display unit is within a first angle range, the foldable display device 11 may recognize that the foldable display unit is in a folded state. If an angle between both sides of the foldable display unit is within a second angle range, the foldable display device 11 may recognize that the foldable display unit is in an unfolded state. The angle included in the first angle range may be less than the angle included in the second angle range. In another embodiment, the state of the foldable display device 11 may be determined based on an operation state of a hinge or using a distance between both sides of the display unit. The foldable display device 11 may activate or deactivate the touch sensor of each area according to the state thereof, which will be described in detail with reference to FIG. 5.

The foldable display device may include a foldable display unit on a front side thereof in an unfolded state and may include a foldable display unit on front and back sides thereof in a folded state.

Figure 2:
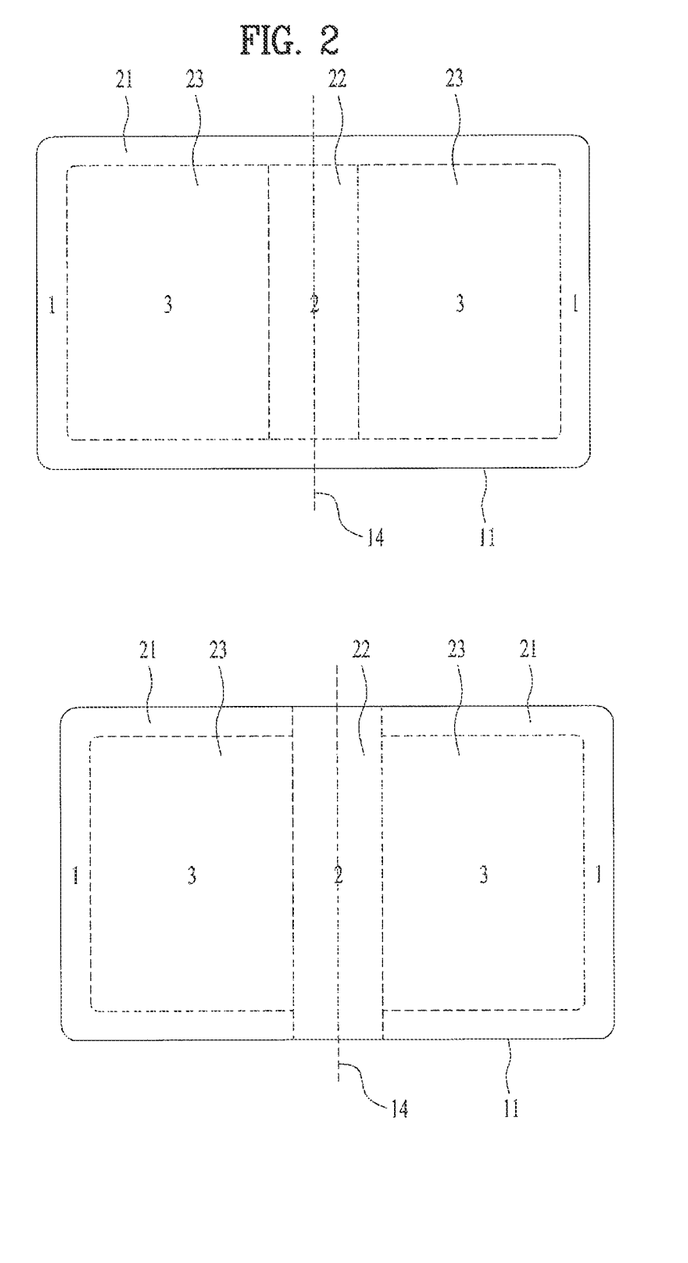
FIG. 2 is a diagram showing areas of a foldable display device according to an embodiment of the present specification.

FIG. 2 is a diagram showing areas of a foldable display device according to an embodiment of the present specification. According to embodiments, the foldable display device 11 may have a touch sensitive display unit at a front side thereof. The foldable display device 11 may not include a bezel.

In the foldable display device 11, a border area of a foldable display unit may be set as a first area 21 and a folding area may be set as a second area 22. An inner area other than the first area and the second area 22 may be set as a third area 23. The second area 22 may be set about the center axis 12.

In FIG. 2, the foldable display device 11 is in an unfolded state. In the foldable display device 11, the touch sensor of the first area 21 may be deactivated in the unfolded state. Deactivating the touch sensor may mean that touch input is ignored or the touch sensor is powered off According to embodiments, the touch sensor of the first area 21 may be deactivated at the hardware level. According to embodiments, a foldable display device without a touch sensor of a first area 21 may be designed. In FIG. 2, the first area 21 of the foldable display device 11 becomes a border area. Accordingly, the foldable display device 11 may deactivate the touch sensor of the first area 21 belonging to the border area to minimize malfunction due to unintentional input through gripping. If the touch sensor of the first area 21 is deactivated, the foldable display device 11 may ignore or bypass touch input when touch input is detected in the first area 21. In another embodiment, if the touch sensor of the first area 21 is deactivated, the foldable display device 11 may perform a function corresponding to a grip when the grip is detected in the first area 21. When the touch sensor detects a grip in a deactivated area, the foldable display device 11 may use the detected grip as grip position information. The foldable display device 11 may display a control menu at a grip position using the grip position information. The foldable display device 11 may display a control menu at the grip position using the grip position information. In addition, the foldable display device 11 may display an indicator indicating the grip position.

The foldable display device 11 may activate the touch sensors of the second area 22 which is the folding area and the third area 23 which is the inner area to detect user touch input.

The foldable display device 11 shown at the lower side of FIG. 2 is different from the foldable display device 11 shown at the upper side of FIG. 2 in terms of the boundary between the first area 21 and the second area 22. The foldable display device 11 in the unfolded state shown at the lower side of FIG. 2 may deactivate the touch sensor of the first area 21 and activate the touch sensors of the second area 22 and the third area.

Figure 3:
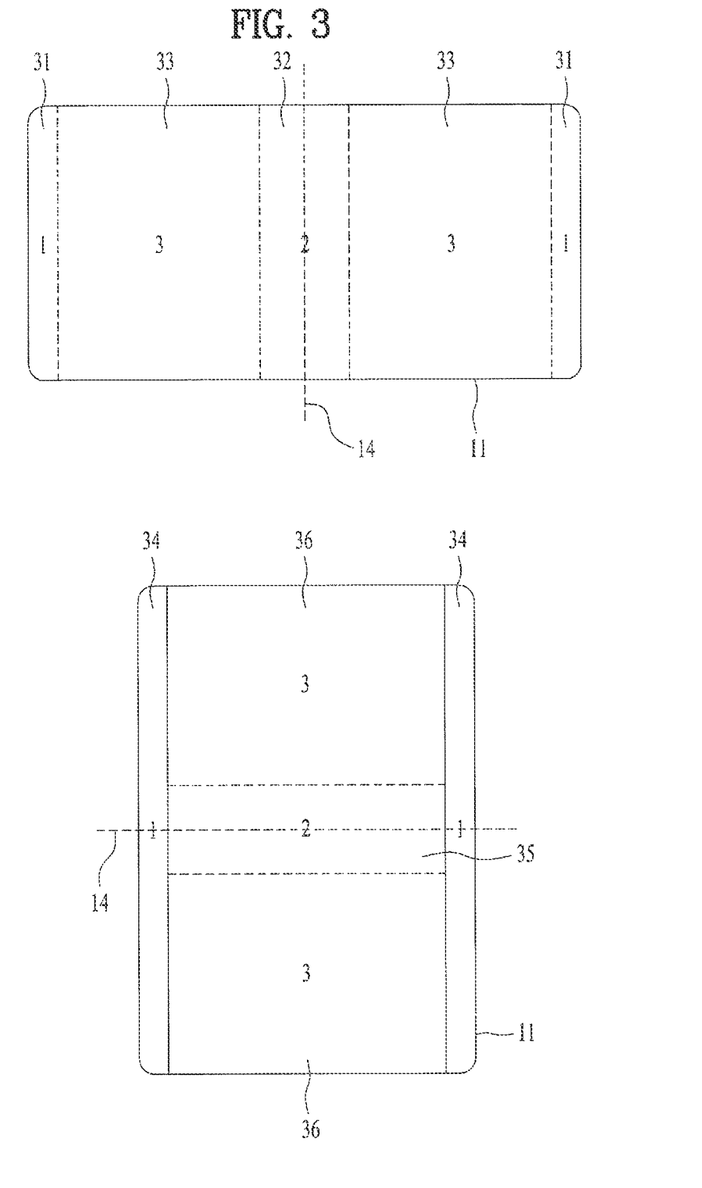
FIG. 3 is a diagram showing areas of a foldable display device according to another embodiment of the present specification.

FIG. 3 is a diagram showing areas of a foldable display device according to another embodiment of the present specification. According to embodiments, the foldable display device 11 may have a touch sensitive display unit at a front side thereof. The foldable display device 11 may not include a bezel.

The upper side of FIG. 3 shows areas if the foldable display mode 11 in an unfolded state is in a landscape mode. The foldable display device 11 may recognize that the foldable display device 11 is gripped by the user in the landscape mode using a gravity sensor, a gyroscope sensor, etc.

If the foldable display device 11 is gripped by the user in the landscape mode, the user may grip the first area 31. Accordingly, the foldable display device 11 may deactivate the touch sensor of the first area 31 corresponding to a short side of the foldable display device in the landscape mode. That is, the foldable display device 11 may deactivate the touch sensors of two sides each having a shorter length among four sides thereof. The foldable display device detects an area gripped by the user and adaptively sets the width of the first area 31. The foldable display device may change the width of the first area 31 in proportion to the width of the area gripped by the user.

The touch sensors of the second area 32 which is the folding area and the third area 33 which is the inner area may be activated to detect user touch input. In the upper side of FIG. 3, the touch sensor of the border area corresponding to the long side of the foldable display device may be activated as compared to FIG. 2. Accordingly, the foldable display device may detect user touch input in an area wider than that of FIG. 2.

The lower side of FIG. 3 shows areas if the foldable display mode 11 in an unfolded state is in a portrait mode. The foldable display device 11 may recognize that the foldable display device 11 is gripped by the user in the portrait mode using a gravity sensor, a gyroscope sensor, etc.

If the foldable display device 11 is gripped by the user in the portrait mode, the user may grip the first area 34. Accordingly, the foldable display device 11 may deactivate the touch sensor of the first area 34 corresponding to a long side among the border areas of the foldable display device in the portrait mode. That is, the foldable display device 11 may deactivate the touch sensors of two sides each having a longer length among four sides thereof. The foldable display device detects an area gripped by the user and adaptively sets the length of the first area 34. The foldable display device may change the length of the first area 34 in proportion to the width of the area gripped by the user.

The touch sensors of the second area 35 which is the folding area and the third area 36 which is the inner area may be activated to detect user touch input. In the lower side of FIG. 3, the touch sensor of the border area corresponding to the short side of the foldable display device in the portrait mode may be activated as compared to FIG. 2. Accordingly, the foldable display device may detect user touch input over a wider area than that of FIG. 2.

Figure 4:
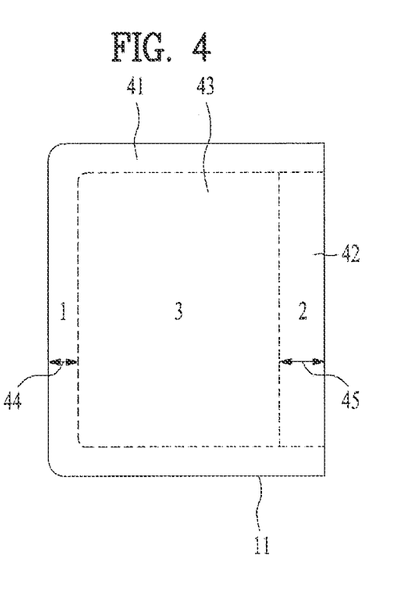
FIG. 4 is a diagram showing a folded state of a foldable display device according to an embodiment of the present specification.

FIG. 4 is a diagram showing a folded state of a foldable display device according to an embodiment of the present specification. According to embodiments, the foldable display device 11 may have a touch sensitive display unit at a front side thereof. The foldable display device 11 may not include a bezel. As shown in FIG. 4, if the foldable display device is in the folded state, touch sensitive display units may be provided on the front side and the rear side thereof.

The foldable display device 11 may deactivate the touch sensors of the first area 41 and the second area 42 in the folded state. Deactivating the touch sensor may mean that touch input is ignored or the touch sensor is powered off. According to embodiments, the touch sensor of the first area 41 may be deactivated at the hardware level. According to embodiments, a foldable display device without a touch sensor of a first area 41 may be designed. In FIG. 4, in the foldable display device 11 of the folded state, the first area 41 and the second area 42 are border areas. Accordingly, the foldable display device 11 may deactivate the touch sensors of the first area 41 and the second area 42 belonging to the border areas to minimize malfunction due to unintentional input through gripping. In addition, the foldable display device 11 may deactivate the touch sensors of the first area 41 and the second area 42 located on the back side in the folded state according to embodiments.

The foldable display device 11 may adaptively change the width 44 of the first area and the width 45 of the second area according to the state or size of the foldable display device 11. For example, the foldable display device 11 may set the width 44 of the first area and the width 45 of the second area in proportion to the size thereof. The foldable display device 11 may set the width 44 of the first area and the width 45 of the second area in the folded state to be narrower than the width 44 of the first area and the width 45 of the second area in the unfolded state. This is because, as the size of the foldable display device is increased, more stable grip is required and thus the user must grip a wider area. The foldable display device 11 may set a border area having a first width in the unfolded state and set a border area having a second width in the folded state. The first width may be equal to or greater than the second width. Therefore, the foldable display device may increase the touch sensitive area reduced due to the folded state by the reduced border area.

The foldable display device 11 may activate the touch sensor of the third area 43, which is the inner area, to detect user touch input. In addition, the foldable display device 11 may deactivate the touch sensor of the third area located on the back side in the folded state according to embodiments. That is, the touch sensor of an area which does not come within the field of vision of the user in the third area 23, in which the touch sensor is activated, may be deactivated.

Figure 5:
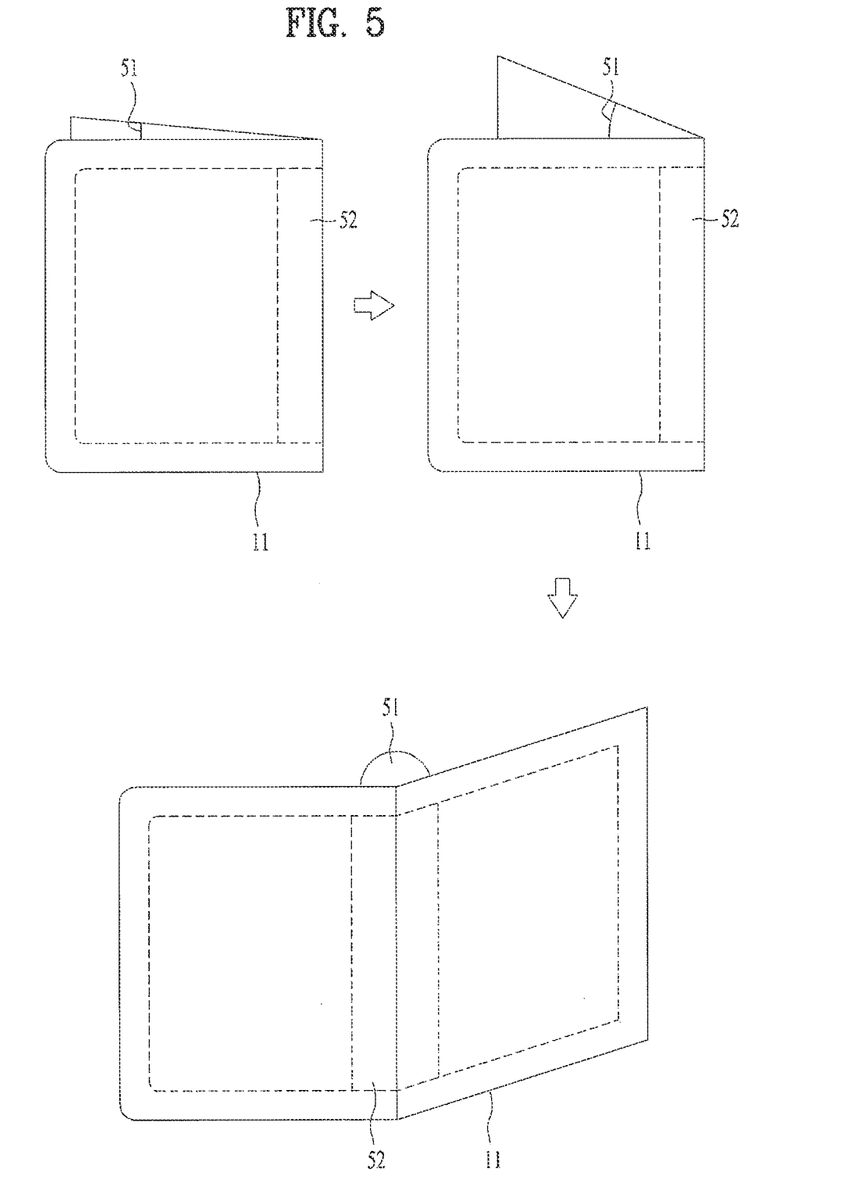
FIG. 5 is a diagram showing a method of determining the state of a foldable display device according to a folding angle of the foldable display device according to an embodiment of the present specification.

FIG. 5 is a diagram showing a method of determining the state of a foldable display device according to a folding angle of the foldable display device according to an embodiment of the present specification. According to embodiments, the foldable display device 11 may have a touch sensitive display unit at a front side thereof. The foldable display device 11 may not include a bezel.

The foldable display device 11 may sense the folding angle 51 of the foldable display device as shown in the left upper side of FIG. 5. The folding angle may be defined as an inner angle of the foldable display unit. The foldable display device 11 may determine the state of the foldable display device using the sensed folding angle 51. The foldable display device 11 may use an illumination sensor or a distance sensor to sense the folding angle 51. The illumination sensor may sense the folding angle according to sensed brightness and the distance sensor may sense the folding angle by measuring a distance between both sides of the display unit of the foldable display device in the folded state. Alternatively, the foldable display device 11 may sense the folding angle using a hinge sensor or a magnetic sensor.

The foldable display device 11 may detect that the foldable display device 11 is in the folded state if the folding angle 51 is equal to or less than a first angle as shown in the left upper side of FIG. 5. In addition, the foldable display device 11 may detect that the foldable display device 11 is in the unfolded state if the folding angle 51 is greater than the first angle as shown in the lower side of FIG. 5.

As another embodiment, the foldable display device 11 may be set to the folded state if the folding angle 51 is less than a second angle. In addition, the foldable display device 11 may be set to the unfolded state if the folding angle 51 is greater than a third angle. If the foldable display device 11 is changed from the unfolded state to the folded state, the touch sensor of the second area 52 which is the folding area may be deactivated when the folding angle 51 is a fourth angle. The fourth angle has a value equal to or greater than the second angle and equal to or less than the third angle and an angle range from the second angle to the fourth angle may be set to be less than an angle range from the fourth angle to the third angle. That is, if the foldable display device 11 is in an intermediate state between the folded state and the unfolded state as shown in the right upper side of FIG. 5, the foldable display device 11 may maintain the touch sensor unit of the second area 52 in the activated state until the foldable display device reaches the folded state.

Figure 6:
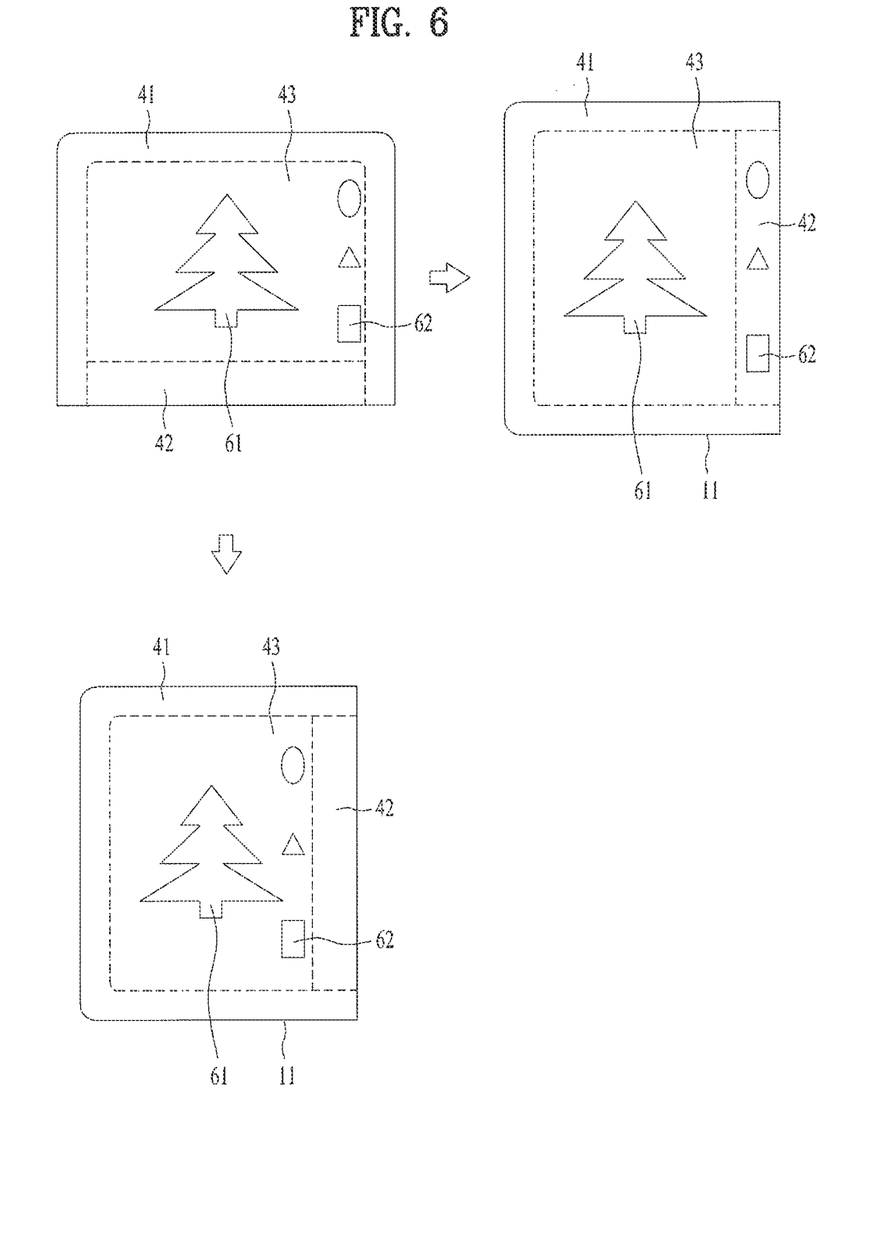
FIG. 6 is a diagram showing a method of changing the position of content and a control button in correspondence with rotation of a foldable display device according to an embodiment of the present specification.

FIG. 6 is a diagram showing a method of changing the position of content and a control button in correspondence with rotation of a foldable display device according to an embodiment of the present specification. According to embodiments, the foldable display device 11 may have a touch sensitive display unit at a front side thereof. The foldable display device 11 may not include a bezel. As shown in FIG. 6, if the foldable display device is in the folded state, touch sensitive display units may be provided on front and back sides thereof.

In the left upper side of FIG. 6, the foldable display device 11 may display an object 61 and a control button 62 in a third area 43, in which the touch sensor is activated. The user may control the object and the control button using touch input if the object 61 and the control button 62 are present in the third area 43.

If the foldable display device 11 rotates as shown in the right upper side of FIG. 6, the foldable display device 11 may rotate the object 61 and the control button 62. The foldable display device 11 may sense the rotation angle of the foldable display device 11 and rotate and display the object 61 and the control button 62 in correspondence with the sensed rotation angle.

If the foldable display device 11 rotates the displayed object 61 and control button 62, some of the object 61 or the control button 62 may be displayed in an area, in which the touch sensor is deactivated. For example, the control button 62 displayed in the third area 43 in the left upper side of FIG. 6 may be displayed in the second area 42 by rotation as shown in the right upper side of FIG. 6. Since the touch sensor is deactivated in the second area 42 of the foldable display device 11 in the folded state, the user may not perform touch input using the control button 62 displayed in the second area 42.

Accordingly, the foldable display device 11 may rotate the displayed content on a per area basis. That is, in rotation of the displayed object 61 or control button 62 due to rotation of the foldable display device, the foldable display device 11 of the present specification rotates the object 61 or the control button 62 on a per area basis, thereby ensuring touch continuity.

As shown in the lower side of FIG. 6, the foldable display device 11 may sense the rotation angle of the foldable display device and rotate the object 61 or the control button 62 displayed in at least one area of the foldable display unit on a per area basis in correspondence with the sensed rotation angle. If the object 61 or the control button 62 is located in an area in which the touch sensor is deactivated by rotation, the foldable display device 11 may move and display the control button 62 in an area in which the touch sensor is activated.

Figure 7:
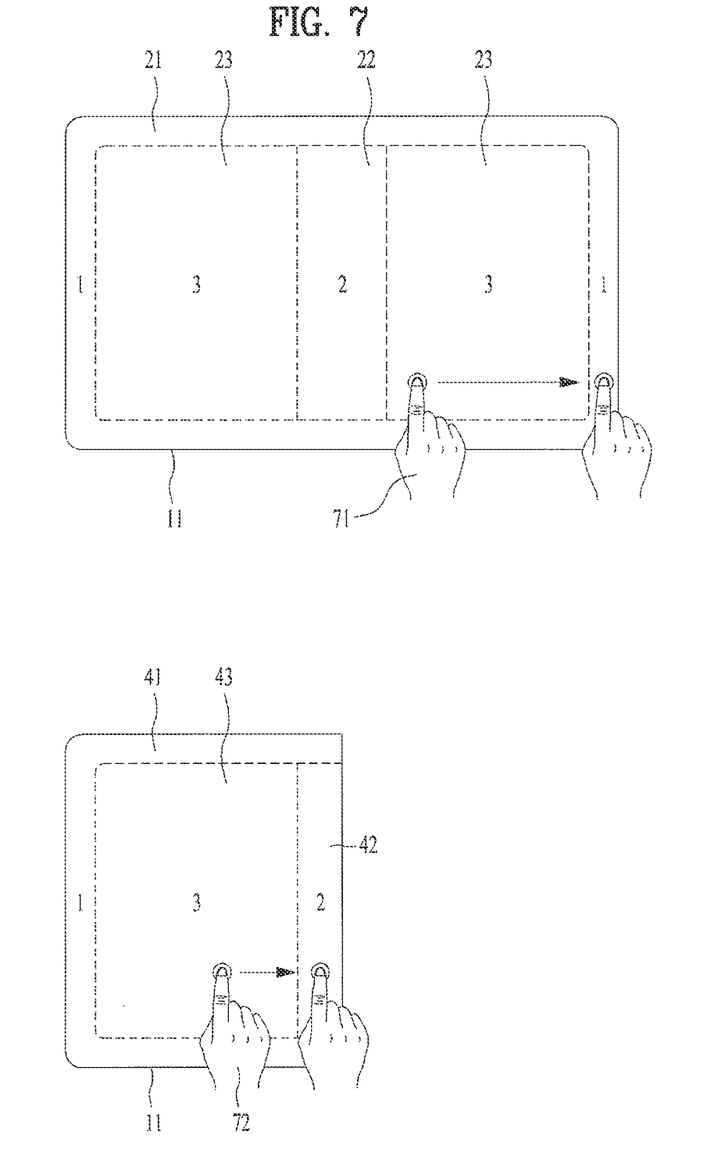
FIG. 7 is a diagram showing exceptions of a touch sensitive area of a foldable display device according to an embodiment of the present specification.

FIG. 7 is a diagram showing exceptions of a touch sensitive area of a foldable display device according to an embodiment of the present specification. According to embodiments, the foldable display device 11 may have a touch sensitive display unit at a front side thereof. The foldable display device 11 may not include a bezel.

The foldable display device 11 may deactivate the touch sensor of the first area 21 in the unfolded state. The foldable display device 11 may detect touch input if touch input detected in the second area 22 or the third area 23 in which the touch sensor is activated is moved into the first area 21 while maintaining contact with the foldable display device. The foldable display device 11 may activate the touch sensor of some of the first area 21 based on a path along which touch input is moved from the second area 22 or the third area 23.

That is, as shown in the upper side of FIG. 7, the foldable display device 11 in the unfolded state may detect first touch input 71 in the third area 23. First touch input 71 may be moved to the right while maintaining contact with the foldable display device. If first touch input 71 enters the first area 21 of the foldable display device, the foldable display device 11 may activate the touch sensor of some of the first area 21. For example, the foldable display device 11 may track movement of first touch input from the third area 23 to the first area 21 and activate the touch sensor of some areas included in the travel direction of first touch input 71 in the first area 21. The foldable display device 11 may temporarily activate the touch sensor of the first area 21 and, if first touch input 71 is released from the foldable display device, the activated touch sensor of some of the first area may be deactivated again. That is, the foldable display device 11 may activate the first area 21 only while control input moved from the third area 23 into the first area 21 is detected while maintaining contact with the foldable display device.

The foldable display device 11 may deactivate the touch sensors of the first area 21 and the second area 22 in the folded state. The foldable display device 11 may detect touch input if touch input detected in the third area 23 in which the touch sensor is activated is moved into the first area 21 or the second area 22 while maintaining contact with the foldable display device. The foldable display device 11 may activate the touch sensor of some of the first area 21 or the second area 22 based on a dragging path from the third area 23.

That is, as shown in the lower side of FIG. 7, the foldable display device 11 in the folded state may detect second touch input 72 in the third area 43. Second touch input 72 may be moved to the right while maintaining contact with the foldable display device. If second touch input 72 enters the second area 42, in which the touch sensor is deactivated, due to folding, the foldable display device 11 may activate the touch sensor of some of the second area 42. For example, the foldable display device 11 may track movement of second touch input 72 from the third area 43 to the second area 42 and activate the touch sensor of some area included in the travel direction of second touch input 72 in the second area 42. The foldable display device 11 may temporarily activate the touch sensor of the second area 42 and, if second touch input 72 is released from the foldable display device, the touch sensor of some of the second area 42 may be deactivated again.

As described above, the foldable display device 11 may adaptively set the touch sensitive area and accurately reflect user touch intention according to exceptions.

Figure 8:
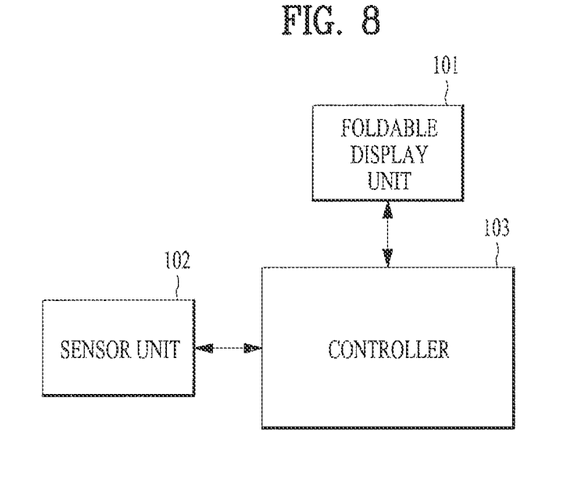
FIG. 8 is a block diagram of a foldable display device according to an embodiment of the present specification.

FIG. 8 is a block diagram of a foldable display device according to an embodiment of the present specification. The display device may include a foldable display unit 101, a sensor unit 102 and a controller 103.

The foldable display unit 101 may display an object and a control button. The foldable display unit 101 may be folded or bent in half with respect to the folding center axis. The foldable display unit 101 may be asymmetrically folded with respect to an arbitrary axis instead of the center axis. In addition, the foldable display device may include two or more folding areas. For example, the foldable display device having two folding center axes may be folded to a size of ⅓ of the total size thereof by dividing a foldable display unit into three areas. The foldable display unit 101 may include at least one of an organic light-emitting diode (OLED), a liquid crystal display (LCD), an electronic ink and flexible display, etc. according to embodiments.

The sensor unit 102 may sense the state of the foldable display device. The sensor unit 102 may measure an inner angle between both sides of the foldable display unit to sense the folded state or the unfolded state. As another embodiment, the sensor unit 102 may determine the state of the foldable display device using a distance between both sides of the display unit of the foldable display device in the folded state or based on the operation state of a hinge. The sensor unit 102 may send information about the state of the device to the controller 103.

The sensor unit 102 may sense touch input to the foldable display device. The sensor unit 102 may sense user touch input using a resistive or capacitive touch sensor. The touch sensor of each area may be activated or deactivated by the controller 103. The sensor unit may send information about sensed touch input to the controller.

The sensor unit 102 may sense a tilt angle or rotation angle of the foldable display device. The sensor unit 102 may use at least one of a gravity sensor, a tilt sensor and a gyroscope sensor to sense the tilt angle or the rotation angle. The sensor unit may send information about the tile angle or the rotation angle to the controller 103. The sensor unit 102 may determine whether the foldable display device is in a portrait mode or a landscape mode using at least one of a gravity sensor, a tilt sensor and a gyroscope sensor.

The touch sensors of the foldable display unit 101 and the sensor unit 102 may be integrated to form a touch sensitive display unit according to embodiments.

The controller 103 may control the sensor unit 102 and the display unit 103 using information received from the sensor unit 102. The controller 103 may detect the state of the foldable display device using the sensor unit 102. The controller 103 may detect whether the foldable display device is in the folded state or the unfolded state. The determination as to whether the foldable display device is in the folded state or the unfolded state may be made based on information about the state of the device received from the sensor unit. The controller may activate or deactivate the touch sensor unit on a per area basis according to the detected state of the foldable display device as described with reference to FIGS. 2 to 6.

The controller 103 may receive information about sensed touch input from the sensor unit 102. The controller 103 may determine whether operation corresponding to touch input is performed depending on in which area touch input is sensed. If touch input is sensed in an area in which the touch sensor is deactivated by the controller, the controller may ignore and bypass the touch input. In addition, if touch input is sensed in an area in which the touch sensor is activated by the controller, the controller may perform operation corresponding to the touch input.

The controller 103 may receive information about the sensed tilt angle or rotation angle from the sensor unit 102. The controller may rotate and display the object and the control button displayed on the foldable display unit 101 based on the received information. The controller may rotate the object and the control button on a per area basis. Therefore, it is possible to prevent the object or the control button from being moved into an area in which the touch sensor is deactivated by rotation.

FIG. 8 is a block diagram according to an embodiment, in which blocks represent logically divided elements of the foldable display device. Accordingly, the elements of the foldable display device may be mounted as one chip or a plurality of chips according to design of the foldable display device.

Figure 9:
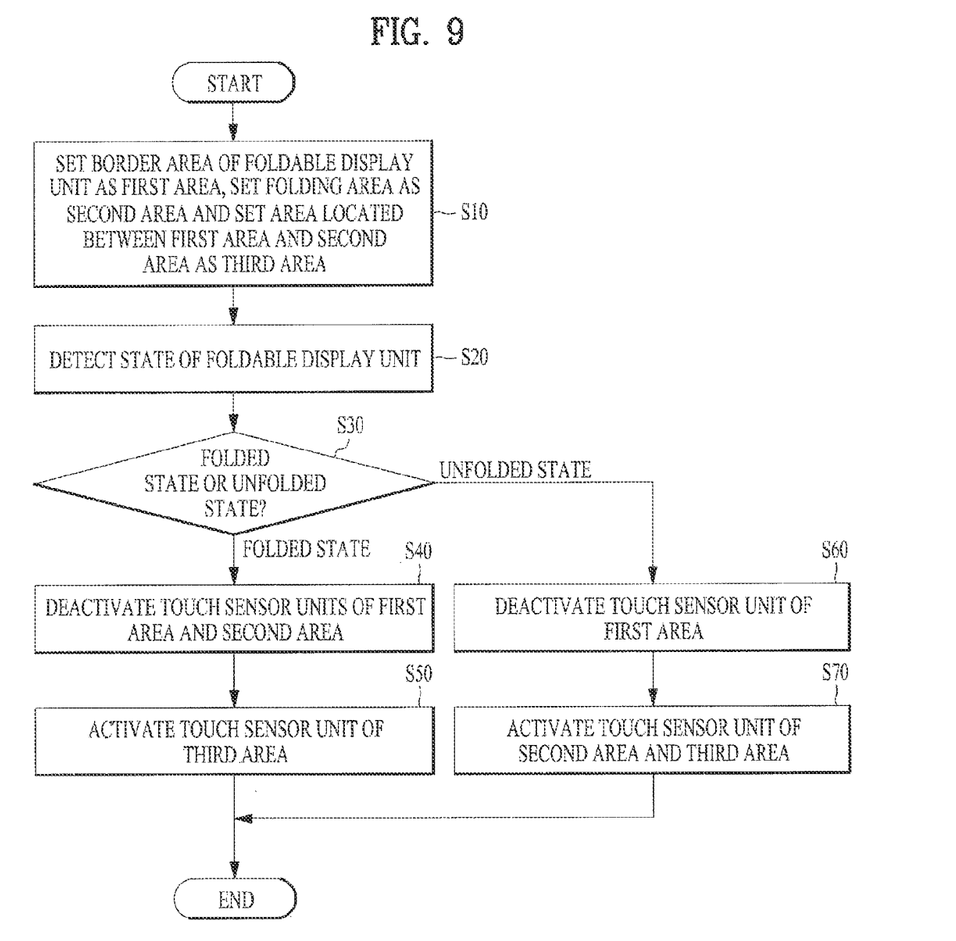
FIG. 9 is a flowchart illustrating a method for controlling a foldable display device according to an embodiment of the present specification.

FIG. 9 is a flowchart illustrating a method for controlling a foldable display device according to an embodiment of the present specification. The foldable display device may set a first area which is a border area of a foldable display unit, a second area which is a folding area and a third area which is located in an inner area between the first area and the second area (S10). As described with reference to FIG. 2, the foldable display device may set a border which may be gripped by a user as the first area. The foldable display device may set left and right areas of the folding center axis as the second area which is the folding area. In addition, the foldable display device may set the inner area of the foldable display unit surrounded by the first area and the second area as the third area. The first area may be gripped by the user in the unfolded state. The second area may be gripped by the user in the folded state.

As described with reference to FIG. 3, the foldable display device may differently set the first area, second area and third area of the foldable display unit according to the portrait mode and the landscape mode.

The foldable display device may detect the state of the foldable display unit (S230). The state of the foldable display unit may include a first state which corresponds to the folded state or a second state which corresponds to the unfolded state. As described with reference to FIG. 8, the foldable display device may detect the state of the foldable display unit using the sensor unit. The foldable display device may measure the inner angle between both sides of the foldable display unit using the sensor unit to detect whether the foldable display device is in the folded state or the unfolded state. As another embodiment, the foldable display device may determine the state of the foldable display unit based on the operation state of a hinge located in the folding area or by sensing a distance between both sides of the folded display unit.

The foldable display device may determine that the state of the foldable display unit corresponds to the first state which is the folded state (S30). If the foldable display unit is in the first state, the touch sensor units of the first area and the second area are deactivated (S40) and the touch sensor unit of the third area may be activated (S50). The foldable display device may determine the state based on information about the state of the foldable display unit sent from the sensor unit to the controller. As described with reference to FIGS. 4 and 5, the first area and second area of the foldable display device may be gripped by the user in the first state which corresponds to the folded state. Accordingly, the foldable display device may deactivate the touch sensor units of the first area and the second area in order to prevent unintentional input due to gripping. The foldable display device interrupts supply of power to the touch sensor unit or ignores touch input from a deactivated area.

The foldable display device may activate the touch sensor unit of the third area to detect user touch input. That is, the foldable display device may detect user touch input from the area of the foldable display unit excluding the first and second areas.

The foldable display device may determine that the foldable display unit is in the second state which is the unfolded state (S30). If the foldable display unit is in the second state, the touch sensor unit of the first area may be deactivated (S60) and the touch sensor units of the second area and the third area may be activated (S70). The foldable display device may determine the state based on information about the state of the foldable display unit sent from the sensor unit to the controller. As described with reference to FIGS. 1 to 3, the first area of the foldable display device may be gripped by the user in the second state which is the unfolded state. Accordingly, the foldable display device may deactivate the touch sensor unit of the first area in order to prevent malfunction due to a grip. The foldable display device interrupts supply of power to the touch sensor unit or ignores touch input from a deactivated area.

The foldable display device may activate the touch sensor units of the second area and the third area to detect user touch input. That is, the foldable display device may detect user touch input from the area of the foldable display unit excluding the first area. Therefore, the user may perform touch input in the areas of the foldable display unit excluding the border area.

As described above, the foldable display device of the present specification may adaptively change the touch sensitive area according to the state thereof to prevent malfunction due to unintended user touch input.

According to the present specification, a foldable display device may selectively activate a touch sensitive area according to a folded state.

According to the present specification, a foldable display device may deactivate a touch sensor unit of a border area to prevent malfunction.

According to the present specification, a foldable display device may rotate an object on a per area basis according to a rotation angle.

According to the present specification, a foldable display device may differently set a border area according to a folded state.

According to the present specification, a foldable display device may activate or deactivate a touch sensitive unit of a folding area according to a folding angle.

According to the present specification, a foldable display device temporarily activates a touch sensor of a deactivated area if control input is moved from an area in which a touch sensor unit is activated and an area in which a touch sensor unit is deactivated.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A foldable display device comprising:
a touch sensitive foldable display unit configured to be in a folded state or an unfolded state, wherein the touch sensitive foldable display unit is foldable with respect to a folding axis, and an area which is adjacent to the folding axis is set as a folding area; and
a controller configured to receive touch inputs on the folding area and only perform a function corresponding to the received touch inputs when the touch sensitive foldable display unit is in the unfolded state,
wherein the controller is further configured to set a width of the folding area according to an area gripped by a user.

2. The foldable display device according to claim 1, wherein the touch sensitive foldable display unit in the folded state is located on front and back sides of the foldable display device.

3. The foldable display device according to claim 1, wherein the controller is further configured to set the width of the folding area according to a size of the foldable display device.

4. The foldable display device according to claim 1, wherein the controller is further configured to deactivate a touch sensing function of a border area when the touch sensitive foldable display unit is in the unfolded state or the folded state.

5. The foldable display device according to claim 4, wherein the controller is further configured to set the width of the border area according to a size of the foldable display device.

6. The foldable display device according to claim 4, wherein the controller is further configured to set the width of the border area according to a state of the foldable display device.

7. The foldable display device according to claim 6, wherein the width of the border area in the folded state is set to be narrower than the width of the border area in the unfolded state.

8. The foldable display device according to claim 1, wherein the controller is further configured to ignore a control input for the folding area when a touch sensing function of the folding area is deactivated.

9. A method of controlling a foldable display device, the method comprising:
folding and unfolding a touch sensitive foldable display unit into a folded state or an unfolded state, respectively, wherein the touch sensitive foldable display unit is foldable with respect to a folding axis, and an area which is adjacent to the folding axis is set as a folding area;
receiving, via a controller, touch inputs on the folding area;
setting a width of the folding area according to an area gripped by a user; and
only performing a function corresponding to the received touch inputs when the touch sensitive foldable display unit is in the unfolded state.

10. The method according to claim 9, wherein the touch sensitive foldable display unit in the folded state is located on front and back sides of the foldable display device.

11. The method according to claim 9, further comprising setting the width of the folding area according to a size of the foldable display device.

12. The method according to claim 9, further comprising deactivating a touch sensing function of a border area when the touch sensitive foldable display unit is in the unfolded state or the folded state.

13. The method according to claim 12, further comprising setting the width of the border area according to a size of the foldable display device.

14. The method according to claim 12, further comprising setting the width of the border area according to a state of the foldable display device.

15. The method according to claim 14, wherein the width of the border area in the folded state is set to be narrower than the width of the border area in the unfolded state.

16. The method according to claim 9, further comprising ignoring a control input for the folding area when a touch sensing function of the folding area is deactivated.

17. A foldable display device comprising:
a touch sensitive foldable display unit configured to be in a folded state or an unfolded state, wherein the touch sensitive foldable display unit is foldable with respect to a folding axis, and an area which is adjacent to the folding axis is set as a folding area; and
a controller configured to:
receive touch inputs on the folding area and perform a function corresponding to the received touch inputs when the touch sensitive foldable display unit is in the unfolded state and not perform the function corresponding to the received touch inputs when the touch sensitive foldable display unit is in the folded state, wherein the controller is further configured to set a width of the folding area according to an area gripped by a user.

* * * * *